(12) United States Patent
Haldane

(10) Patent No.: US 11,631,058 B2
(45) Date of Patent: Apr. 18, 2023

(54) SYSTEMS AND METHODS FOR SCHEDULING APPRAISALS USING AUTOMATIC APPRAISER SELECTION BASED ON GEOGRAPHY

(71) Applicant: Appraisers Now Ltd., Red Deer (CA)

(72) Inventor: Marty Haldane, Red Deer (CA)

(73) Assignee: APPRAISERS NOW LTD., Red Deer (CA)

( * ) Notice: Subject to any disclaimer, the term of this patent is extended or adjusted under 35 U.S.C. 154(b) by 0 days.

(21) Appl. No.: 17/808,606

(22) Filed: Jun. 24, 2022

(65) Prior Publication Data

US 2022/0318764 A1 Oct. 6, 2022

Related U.S. Application Data

(63) Continuation of application No. 16/570,498, filed on Sep. 13, 2019, now Pat. No. 11,392,903.
(Continued)

(51) Int. Cl.
*G06Q 10/10* (2012.01)
*G06Q 30/02* (2012.01)
(Continued)

(52) U.S. Cl.
CPC ......... *G06Q 10/1097* (2013.01); *G06F 9/542* (2013.01); *G06Q 30/0278* (2013.01); *G06Q 50/163* (2013.01)

(58) Field of Classification Search
None
See application file for complete search history.

(56) References Cited

U.S. PATENT DOCUMENTS 8,140,421 B1 3/2012 Humphries et al.
2002/0002494 A1 1/2002 Beam et al.
(Continued)

OTHER PUBLICATIONS

M. Asghari and C. Shahabi, "On on-line task assignment in spatial crowdsourcing," 2017 IEEE International Conference on Big Data (Big Data), 2017, pp. 395-404, doi: 10.1109/BigData.2017. 8257951. (Year: 2017).*

*Primary Examiner* — Stephanie Z Delich
(74) *Attorney, Agent, or Firm* — Bookoff McAndrews, PLLC

(57) ABSTRACT

Disclosed are methods, systems and non-transitory computer-readable medium for scheduling real estate appraisals using an automatic appraisal inspection performer selection process based on geography. For instance, a method may include: receiving a location of a real estate property to be appraised and a request to automatically assign an appraisal inspection performer ID for appraisal inspection of the property; selecting an appraisal inspection performer ID based on proximity of the location of the property to a location associated with the appraisal inspection performer ID, the location associated with the appraisal inspection performer ID being a location of an appraisal inspection performer device corresponding to the selected appraisal inspection performer ID or a location of one or more appraisal inspections already assigned to the appraisal inspection performer ID; and transmitting a notification indicating a new order for appraisal inspection of the property, the new order including the location of the property.

20 Claims, 13 Drawing Sheets

Related U.S. Application Data

(60) Provisional application No. 62/731,648, filed on Sep. 14, 2018.

(51) Int. Cl.
   *G06Q 10/1093* (2023.01)
   *G06F 9/54* (2006.01)
   *G06Q 50/16* (2012.01)

(56) References Cited

U.S. PATENT DOCUMENTS

| | | |
|---|---|---|
| 2008/0033853 A1 | 2/2008 | Beam et al. |
| 2008/0201247 A1* | 8/2008 | Bradford .............. G06Q 30/00 705/35 |
| 2009/0240550 A1* | 9/2009 | McCarty ............ G06Q 30/0603 705/7.13 |
| 2011/0112881 A1 | 5/2011 | Malhotra et al. |
| 2015/0112742 A1 | 4/2015 | Rivera et al. |
| 2016/0100302 A1 | 4/2016 | Barash et al. |

* cited by examiner

FIG. 8

SYSTEMS AND METHODS FOR SCHEDULING APPRAISALS USING AUTOMATIC APPRAISER SELECTION BASED ON GEOGRAPHY

RELATED APPLICATION

This application is a continuation of and claims the benefit of U.S. application Ser. No. 16/570,498, filed Sep. 13, 2019, which claims priority to U.S. Provisional Application No. 62/731,648, filed Sep. 14, 2018, each of which are incorporated herein by reference in their entireties.

TECHNICAL FIELD

Various embodiments of the present disclosure relate generally to scheduling real estate appraisals and, more particularly, to scheduling real estate appraisal inspections using an automatic selection process that selects an appraisal inspection performer based on geography.

BACKGROUND

In the mortgage industry, lenders such as banks utilize independent third-party appraisers to conduct appraisals of real estate property. During a mortgage application process, the lender is tasked with coordinating with an appraiser to appraise the property. Once an appraiser has been assigned, the appraiser travels to the property and collects the necessary information for the appraisal. The appraiser then completes the report and delivers the appraisal to the lender or an intermediate party.

A lender may use an appraisal management company (AMC) to manage the process of finding an appraiser. The lender would first submit an order to the chosen AMC. The AMC would then submit the order to an appraisal company, which then assigns the appraisal to an appraiser, who may be an employee of the appraisal company or a contractor. Besides AMCs, a lender could also use an appraisal management system (AMS) to interact with appraisers. Through the AMS, the lender would submit an order to an appraisal company, which will assign an appraiser for the order. In other situations, the lender may have in-house appraisers that the lender may utilize.

Typically, a residential appraisal report can be completed within one day after the appraisal inspection. Nonetheless, in the United States, real estate appraisals performed for mortgage financial may take up to two weeks, and sometimes up to three weeks in certain areas. The length of time it takes for a lender to obtain a completed appraisal has caused some lenders to turn to alternative options, such as hybrid appraisals (which use a light form different than the standard Fannie Mae 1004 form), automated valuations, and even appraisal waivers. Appraisal waivers are risky because such waivers tend to be applied to rural areas where there is more risk to value fluctuations than urban areas with higher population densities.

One reason why appraisals may take a long time to complete is the geographical spread of properties to be appraised. Appraisers have to travel to properties to collect information needed to complete an appraisal report. Geographical spread of properties therefore poses logistical challenges. Therefore, there is a need for methods and systems that are capable of streamlining the inspection booking process based on data on geographical locations and appraiser availability.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for scheduling an appraisal inspection by automatically selecting an appraisal inspection performer (e.g., appraiser) based on geography.

For instance, the method may include: receiving, from a user device connected to the computer system, a location of a real estate property to be appraised and a request to automatically assign an appraisal inspection performer ID for appraisal inspection of the property; selecting an appraisal inspection performer ID based on proximity of the location of the property to a location associated with the appraisal inspection performer ID, the location associated with the appraisal inspection performer ID being a location of an appraisal inspection performer device corresponding to the selected appraisal inspection performer ID or a location of one or more appraisal inspections already assigned to the appraisal inspection performer ID; and transmitting, to the appraisal inspection performer device corresponding to the selected appraisal inspection performer ID, a notification indicating a new order for appraisal inspection of the property, the new order including the location of the property Furthermore, the system may include: a memory storing instructions; and one or more processors to execute the instructions to perform operations including: receiving, from a user device connected to the computer system, a location of a real estate property to be appraised and a request to automatically assign an appraisal inspection performer ID for appraisal inspection of the property; selecting an appraisal inspection performer ID based on proximity of the location of the property to a location associated with the appraisal inspection performer ID, the location associated with the appraisal inspection performer ID being a location of an appraisal inspection performer device corresponding to the selected appraisal inspection performer ID or a location of one or more appraisal inspections already assigned to the appraisal inspection performer ID; and transmitting, to the appraisal inspection performer device corresponding to the selected appraisal inspection performer ID, a notification indicating a new order for appraisal inspection of the property, the new order including the location of the property.

Furthermore, the non-transitory computer-readable medium storing instructions that, when executed by one or more processors, cause the one or more processors to perform a method. The method includes: receiving, from a user device connected to the computer system, a location of a real estate property to be appraised and a request to automatically assign an appraisal inspection performer ID for appraisal inspection of the property; selecting an appraisal inspection performer ID based on proximity of the location of the property to a location associated with the appraisal inspection performer ID, the location associated with the appraisal inspection performer ID being a location of an appraisal inspection performer device corresponding to the selected appraisal inspection performer ID or a location of one or more appraisal inspections already assigned to the appraisal inspection performer ID; and transmitting, to the appraisal inspection performer device corresponding to the selected appraisal inspection performer ID, a notification indicating a new order for appraisal inspection of the property, the new order including the location of the property Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 8 is an example of a graphical interface displaying a list of appraisal orders of a lender, according to one or more embodiments.

DETAILED DESCRIPTION OF EMBODIMENTS

Various embodiments of the present disclosure relate generally to scheduling real estate appraisals and, more particularly, to scheduling real estate appraisals using an automatic selection process to select an appraisal inspection performer based on geography.

In general, the present disclosure is directed to a method that utilizes a location of an appraisal inspection performer and/or a location of one or more appraisal inspections already assigned to the appraisal inspection performer, in order to select an appraiser that is close to the location of a property for which an appraisal inspection is requested.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In this disclosure, the term "based on" means "based at least in part on." The term "one or more of," when preceding a list of items defined using the conjunction "and," denotes an alternative expression that may be satisfied by a single item in the list or a combination of items in the list. The term "or" is meant to be inclusive and means either, any, several, or all of the listed items. The singular forms "a," "an," and "the" include plural referents unless the context dictates otherwise. The term "exemplary" is used in the sense of "example" rather than "ideal."

In this disclosure, an "appraisal inspection performer" may be an appraiser or an inspector who conducts an inspection for purposes of appraisal. The term "appraiser" is generally used in the following description as an example of an appraisal inspection performer. However, it is understood that whenever the term "appraiser" is used, particularly in the sense of person who conducts an appraisal inspection, the disclosure is considered to have disclosed the same features performed with respect to an "inspector" (or an appraisal inspection performer in general). For example, an "appraiser device" may instead be an inspector device (or generically an appraisal inspection performer device), and an "appraiser ID" may instead be an inspector ID (or generically an appraisal inspection performer ID). A plurality of appraiser devices may include a combination of appraiser devices and inspector devices, and may also be called a plurality of appraisal inspection performer devices.

In this disclosure, the term "appraisal" includes broader concepts of "valuation" and value analysis."

Figure 1:
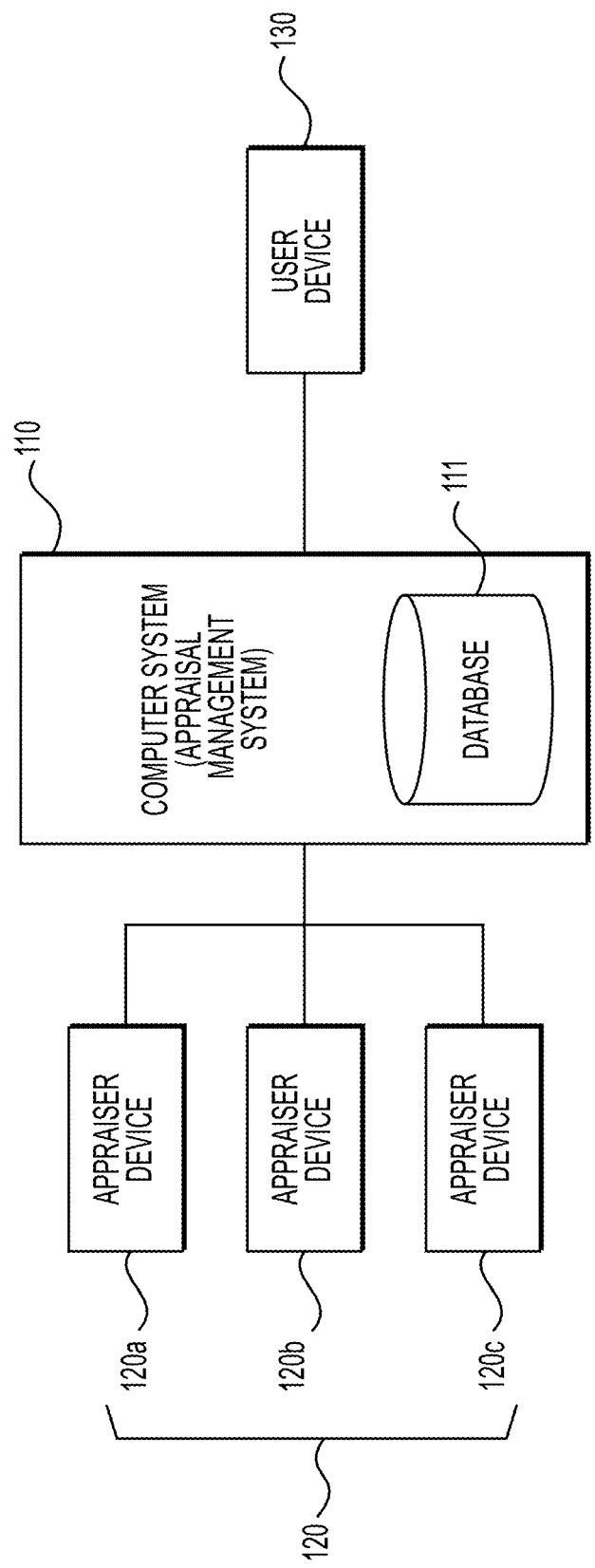
FIG. 1 illustrates an example of a system according to one or more embodiments.

FIG. 1 illustrates a system according to the present disclosure. The system 100 includes a computer system 110 connected to a user device 130 and to a plurality of appraiser devices 120. Computer system 110 may be a server configured to provide an appraisal management service, and may also be called an appraisal management system, an appraisal management service system, or an appraisal scheduling system. The computer system may include a database 111, which may comprise one or a plurality databases.

The user device 130 may be a computing device operated by a user of the appraisal management service. This user of the appraisal management service may be any user, company, or party seeking to schedule appraisal appointments, such as a lender.

Appraiser devices 120 may each be a device used by an appraiser. Each of the appraiser devices 120 may be a computing device, such as a mobile computing device (e.g., smartphone or tablet) or a personal computer. In certain embodiments, at least a portion of the appraiser devices are mobile computing devices that are capable of providing real-time location information to the computer system 110.

Each of the plurality of appraiser devices 120 may be associated with a respective appraiser ID. The appraiser ID may be an identifier of an account, for the appraisal management service, that belongs to an appraiser using the respective appraiser device. Individual appraisers may be part of an appraisal company, and the relationship between appraisers and appraisal companies may be stored in the database 111 of the computer system. For example, the computer system 110 may store, in database 111, appraiser IDs and their associations with appraisal company IDs, and other data. Since the computer system 110 may track appraisers and their accounts by the appraiser ID, in this disclosure, whenever the computer system 110 is disclosed as performing a certain operation with respect to an appraiser or appraiser account, it is understood that the computer system 110 may be performing the operation with respect to the appraiser ID of the appraiser.

One or more of the plurality of appraiser devices 120 may indicate to the computer system 110 that the appraiser operating the appraiser device is currently available to conduct a real estate appraisal. For example, the appraisal device may be a mobile computing device having a mobile application enabling the appraiser using the device to set a status to a status indicating current availability (which may also be referred to as an "available now" status). The mobile application may be a mobile application designed for using an appraiser account on the appraisal management service and may be particularly configured to communicate the currently available status to the computer system 110. In response to receiving an indicating of currently available status from an appraiser device, the computer system 110 may then register, in the database 111 and/or memory of the computer system 110, the appraiser ID associated with the appraiser device as an appraiser ID of a currently available appraiser.

Additionally, the computer system may receive real-time information from the appraiser device of the location of the appraiser device, and display the location of the appraiser device on a map visible to the user device 130 in real-time. For example, the appraisal device with the aforementioned mobile application may be a smartphone or other mobile computing device that is equipped with a GPS configured to obtain the location of the appraisal device in real-time. The mobile application may have software features enabling the appraisal device to share the location of the appraisal device with the computer system 110 in real-time.

The appraisal device may also share data of existing appraisal appointments with a lender. For example, the computer system 110 may have a database in which appraiser IDs are associated with existing appraisal appointments. Existing appraisal appointments may be inspection appointments that have been assigned to the respective appraiser account or inspection appointments that have been both assigned to and accepted by the respective appraiser account.

If an appraiser is operating an appraiser account that has one or more existing appraisal appointments, the appraiser may choose to share data of any one or more of the existing appraisal appointments. For example, the appraiser device may transmit a share command to the computer system 110 to share data of one or more existing appraisal appointments. Such data may include the location, time, and/or date of existing appraisal appointments, and may omit any data that is considered to be confidential. In this context, data of an existing appraisal appointment that is shared with a lender may be, but does not necessarily have to be, directly visible to the user; the data only needs to be available for usage by the computer system 110 for benefit of the user, such as for the purpose of automatically finding appraisers for the user and for purposes of carrying out various embodiments of this disclosure.

In response to receiving a share command from an appraisal device, the computer system 110 may make the information indicated by the share command usable for the benefit of certain users (e.g., lenders) of the appraisal management service. The share command may indicate a specific lender or group of lenders with which the data is to be shared, in which case the computer system 110 may make the data usable for the benefit of only the indicated lenders or group of lenders.

Figure 2:
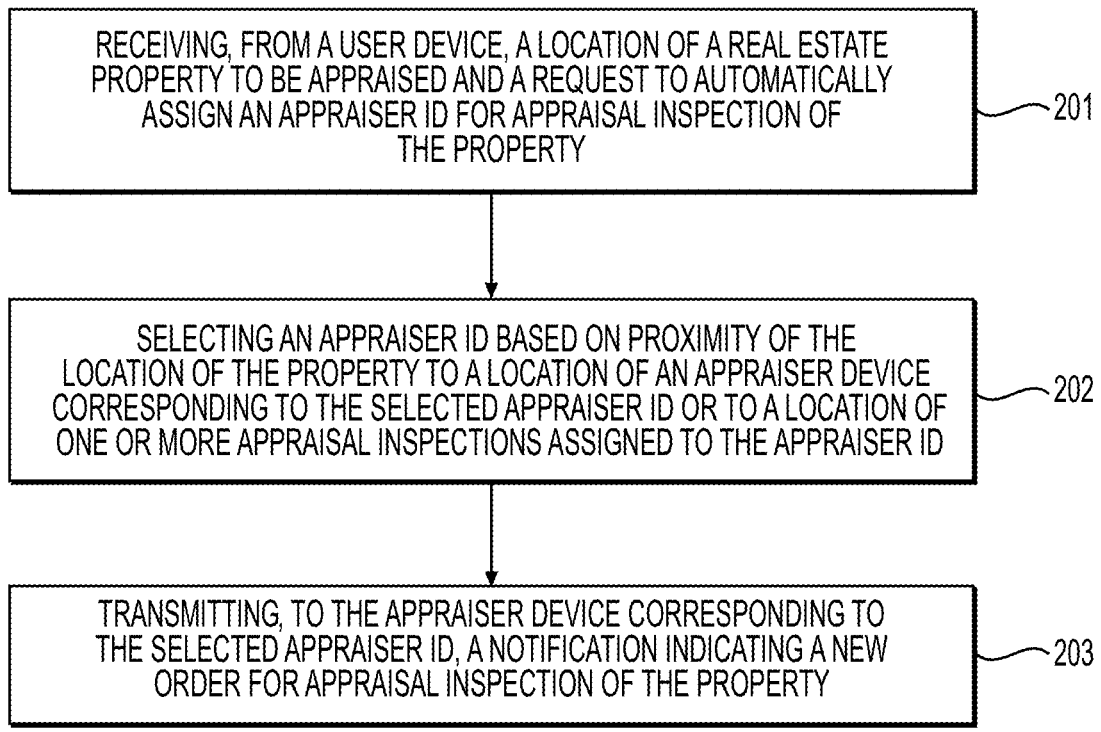
FIG. 2 is a flowchart of a method for automatically finding an appraiser for a real estate appraisal order, according to one or more embodiments.

FIG. 2 illustrates a method for automatically finding an appraiser for a real estate appraisal order. The method may be performed by computer system 110 of FIG. 1. The method includes receiving, from a user device, a location of a real estate property to be appraised and a request to automatically assign an appraiser ID for appraisal inspection of the property (operation 201); selecting an appraiser ID based on proximity of the location of the property to a location of an appraiser device corresponding to the selected appraiser ID or to a location of one or more existing appraisal inspections assigned to the appraiser id (operation 202); and transmitting, to the appraiser device corresponding to the selected appraiser ID, a notification indicating a new order for appraisal inspection of the property (operation 203).

As indicated in operation 202 of FIG. 2, the automatic selection of the appraiser ID may be based on proximity of the property to the location of the appraiser device or based on proximity of the property to the location of one or more appraisal inspections already assigned to the appraisal ID. The location of the appraiser device and the location of existing appraisal inspections can both be described as locations associated with the appraiser device and as locations shared by the appraiser device with a lender. Examples methods of utilizing one of these two types of locations for automatic selection of the appraisal ID in operation 202 are discussed below.

Figure 3A:
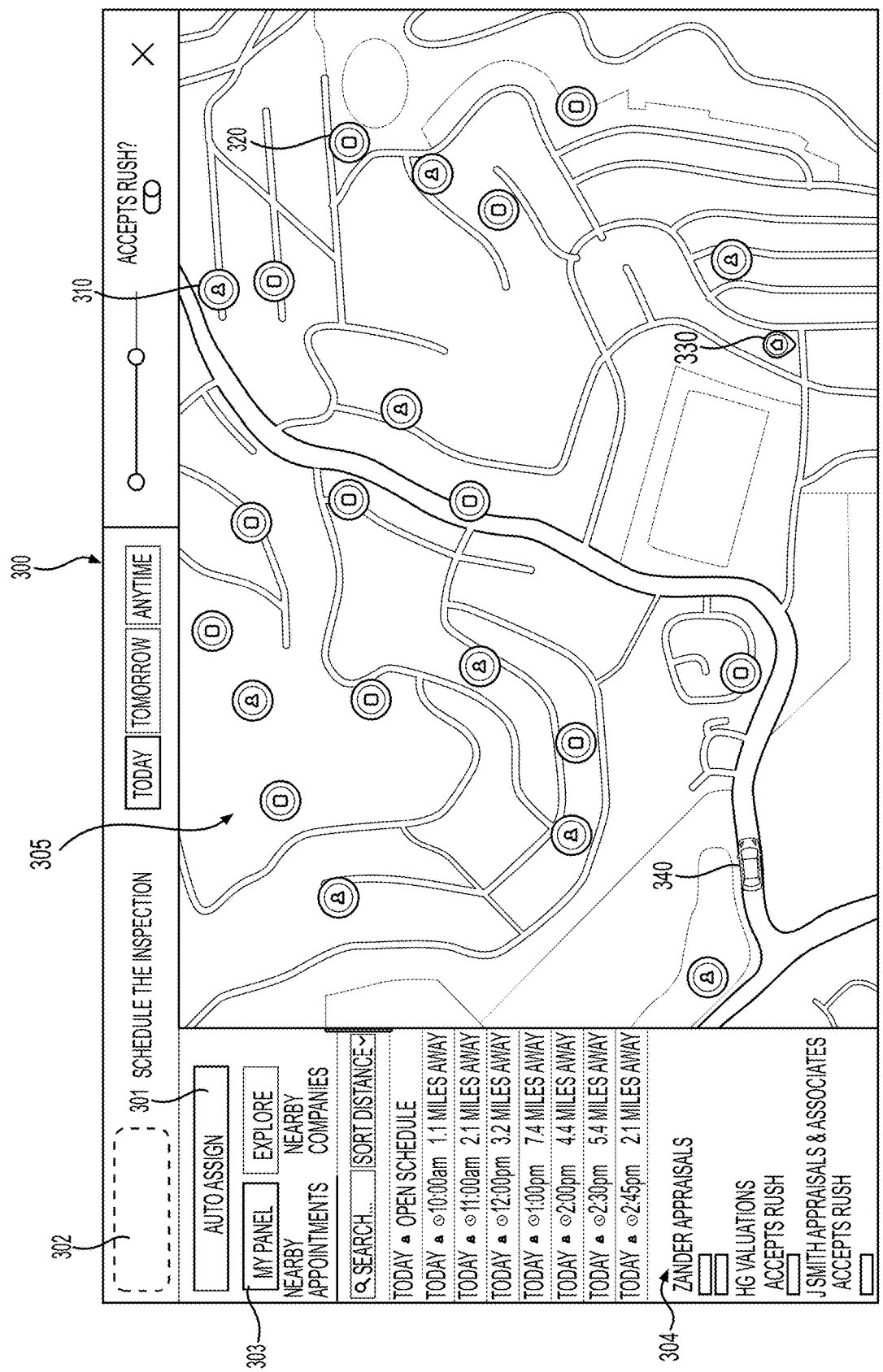
FIGS. 3A-3C illustrate graphical interfaces for a method for automatically finding an appraiser for a real estate appraisal order, according to one or more embodiments.
Figure 3B:
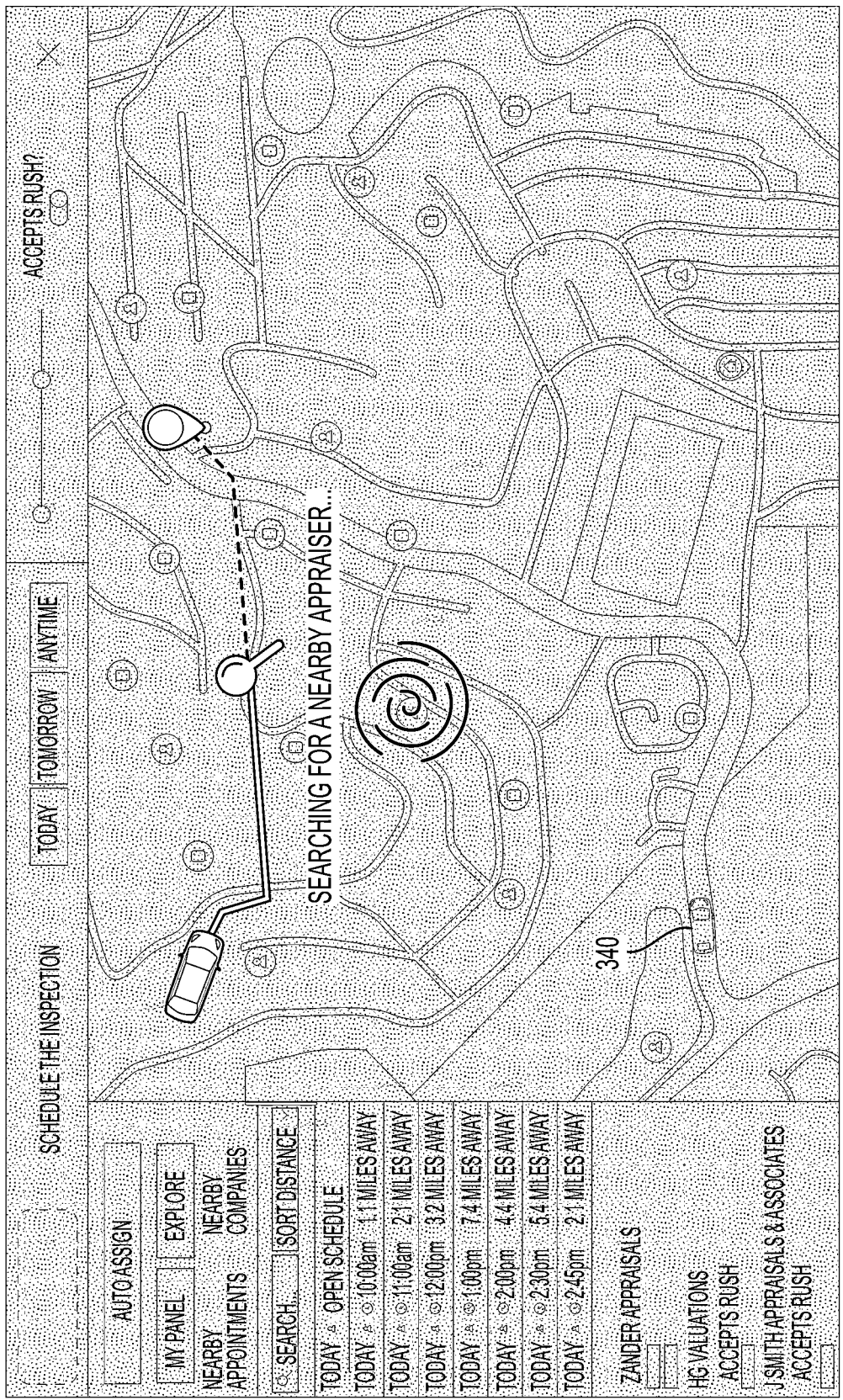
Figure 3C:
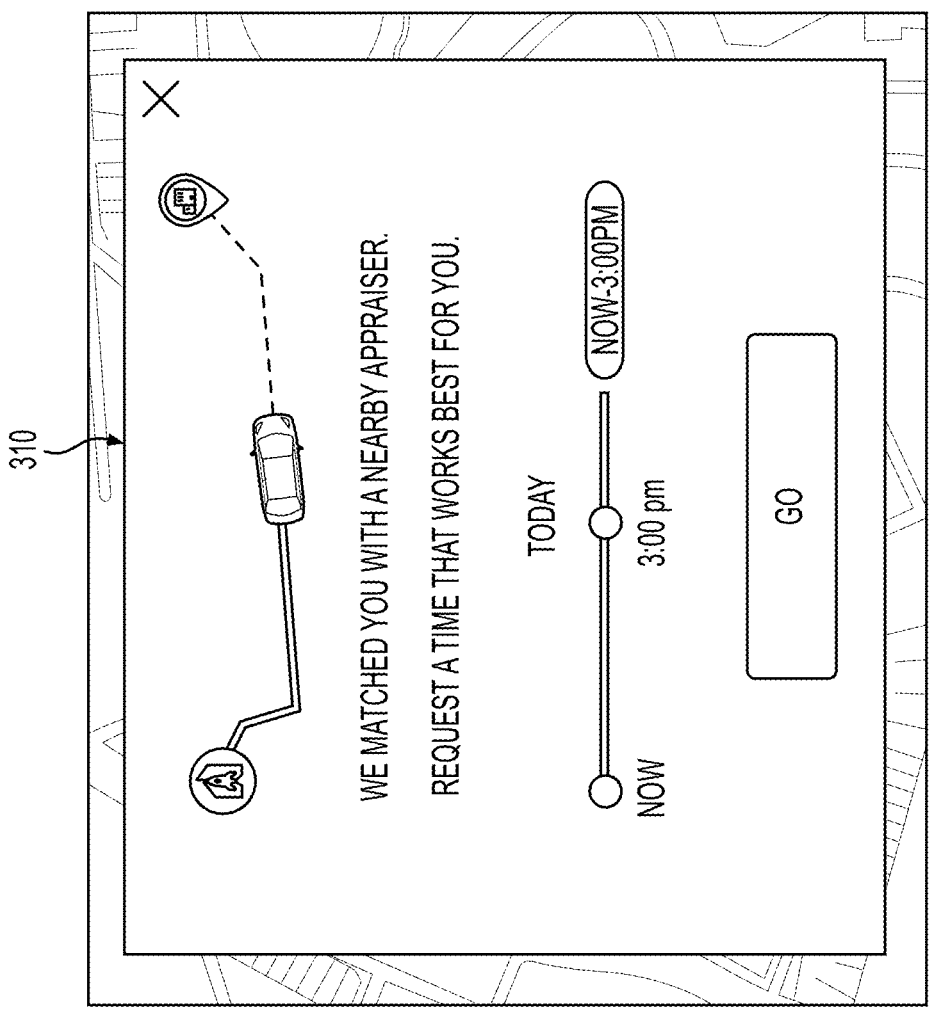

Referring to FIGS. 3A-3C, a method for automatic selection of the appraiser ID based on proximity of the property to the location of the appraiser device is discussed below as one possible implementation of operation 202 of FIG. 2.

FIG. 3A illustrates an example of a user interface 300 for using the appraisal management service. The user interface 300 may be displayed on an application (such as a web browser) running on the user device 120, and may be used by a personnel of the lender, for example. The user interface 300 may include an automatic appraiser assignment button 301 used to input a request for the appraisal management service to automatically assign an appraiser for appraisal inspection, a "my panel" button 303 used to display a list 304 of appraisal companies that are within the network of the lender, and a map 305.

The map 305 may display graphical indicators 310 (circles with a user icon inside) indicating the locations of appraisal appointments ordered by the lender, graphical indicators 320 (a circle with a rectangle inside) indicating the locations of appraisal company offices, and graphical indicators 340 (car icon) indicating the current locations of appraisal devices that are sharing their current location. The current locations of appraiser devices may be updated in real-time time based on real-time location data provided by appraiser devices. Graphical indicators may also be referred to as markers.

As discussed earlier, a mobile application installed on an appraisal device may be operated by the appraiser using the appraiser device to indicate that they are currently available ("available now") for immediate appraisal inspection. When the appraiser device has indicated current availability for immediate appraisal inspection, its current GPS location may displayed on map 305 as a graphical indicator 340.

Using the user interface 300 or another interface of the appraisal management service, the lender may input the location of a property to be appraised. The location of the property to be appraised may be displayed as a graphical indicator 330 on the map 305. The user may then input a request to automatically assign an appraiser for appraisal inspection of the property by activating the automatic appraiser assignment button 301.

Upon receiving the request, the computer system 110 finds an appraiser device, from among appraiser devices that have indicated current availability to perform an appraisal that is most proximate to the location of the property to be appraised. This process may be performed by determining a set of appraisal devices that meet a certain criteria (e.g., belonging to the network of the user and having been indicated as being currently available to perform an appraisal inspection), determining a proximity of each of the appraisal devices to the location of the property to be appraised, and finding the appraisal device that of the closet proximity.

In general, proximity, also referred to as geographic proximity, between two locations may, for example, be a difference between two geographical locations, a road distance (distance to travel between two geographical locations by following roads), or travel-time proximity. The computer system 110 may determine proximity by computation based on geographical coordinates. Geographical coordinates may include coordinates derived from an address (e.g., an address of the location of the property to be appraised). In the instant case that the appraiser device is one of the two locations, the geographic coordinates of the appraiser device may be provided by the appraiser device. In certain implementations, the computer system 110 may query an external source to obtain a measure of proximity or to obtain geographical coordinates of an address.

When the closest (most proximate) appraiser device has been found, the corresponding appraiser ID can also be determined.

During the above process, the user interface 300 may darken and display a message indicating that automatic assignment of an appraiser is being performed, as shown in FIG. 3B. When the closest appraiser device (and the corresponding appraiser ID) has been found, the user interface 300 may display a scheduling interface 310 as shown in FIG. 3C. The scheduling interface 310 may contain a notification that a nearby appraiser has been found and a message requesting the user to select a time for the appraisal inspection. The scheduling interface 310 may have interface element enabling the user to set a time for the appraisal inspection. For example, as shown in FIG. 3C, the scheduling interface 310 may have a slider bar to select the timing of the appraisal inspection. In some cases, the user may request the appraisal inspection to be conducted immediately, given that the selected appraiser has indicated such an availability. While not specifically shown, the scheduling interface 310 may also permit selection of a day other than the current day, in the manner shown in FIG. 4A discussed below.

When the user confirms a certain time using the scheduling interface 310 (such as by pressing the "Go" button in the interface shown in FIG. 3C), the computer system 110 may transmit, to the appraiser device corresponding to the selected appraiser ID, a notification indicating a new order for appraisal inspection of the property (operation 203). The appraiser device may transmit, to the computer system 110, a reply indicating acceptance or rejection of the new order. If the new order is accepted, the appraisal inspection is scheduled, and the appraiser drives to the property to complete the inspection. Afterwards the appraiser may use a report writer to finish the designated report.

Accordingly, users of the appraisal management system, such as lenders, can be matched up with an appraiser that has the closest proximity to the subject property desired to be appraised. The appraiser is also satisfied because they have indicated they are available and just got more work.

Next, a method for automatic selection of the appraiser ID based on proximity of the property to the locations appraisal inspections already assigned to the appraisal ID is discussed below as another possible implementation of operation 202 of FIG. 2.

As discussed above, an appraiser using the appraisal management system may choose to share, with the lender, locations of their other appraisal inspection appointments. For example, an appraiser has an order scheduled for tomorrow at 9:00 AM at 158 Oak Street. This order may be stored in database 111 of the computer system 110 in which a corresponding order ID is associated with the account ID of the appraiser. In addition to the locations of the appraisal inspection appointments, the appraiser may also share information about the location and time of the appraisal a lender.

If the lender later wishes to obtain an appraisal at a nearby location of 123 Oak Street and invokes the automatic appraiser assignment feature, the computer system 110 may automatically select the appraiser ID associated with the 158 Oak Street 9:00 AM appointment based on proximity of this location with the 123 Oak Street location of the property to be appraised. The computer system 110 may then notify the lender that they can request an appraisal inspection as fast as tomorrow between 8 AM and 11 AM.

When the lender invokes the auto-assign feature, the computer system may select an appraiser for conducting an appraisal inspection by using an assignment algorithm that determines one or more factors for each appraiser ID within a candidate pool of appraiser IDs. If the assignment algorithm considers a combination of factors, the computer system may weigh a combination of the above factors to determine a certain index used for appraiser assignment (that is, the index may be a function of the considered factors). Examples of factors that may be used in the assignment algorithm include:

the proximity of the property location to the locations of existing inspection appointments assigned to the appraiser ID (for example, a closer proximity may generally correlate with a greater chance that the appraiser is selected);

the dates and times of the existing inspection appointments;

the proximity between the property location and the head office of the appraisal company to which the appraiser ID belongs (for example, the closer the proximity, the greater the chance that the appraiser is selected);

the acceptance rate at which the appraiser accepts a new appraisal order sent by the appraisal management system (for example, the higher the acceptance rate, the higher the chance that the appraiser is selected);

an overdue percentage associated with the appraiser, such as the percentage of appraisal orders assigned to the appraiser that have an overdue task (for example, the lower the overdue percentage, the higher the chance that the appraiser is selected); and the fee charged by the appraiser (for example, the higher the fee, the lower the chance that the appraiser is selected).

The candidate pool of appraisers may be determined by one or more criteria, such as whether the appraiser is within the lender's network, and whether the appraiser is servicing the general region of the property location.

Additionally the appraiser ID selected from the candidate pool may be a plurality of appraiser IDs corresponding to a plurality of appraisers. In certain implementations, the computer system 110 may select appraisal companies rather than individual appraisers. In this case, the above factors may still be determined for individual appraisers within an appraisal company, in order to select an appraisal company for the lender.

Once an appraiser or appraisal company is selected, the computer system 110 indicates to the lender device 120 that the appraiser or appraisal company is available, along with dates and times of availability. The dates and times of availability may be determined based on the dates and times of the existing inspection appointments.

Figure 4A:
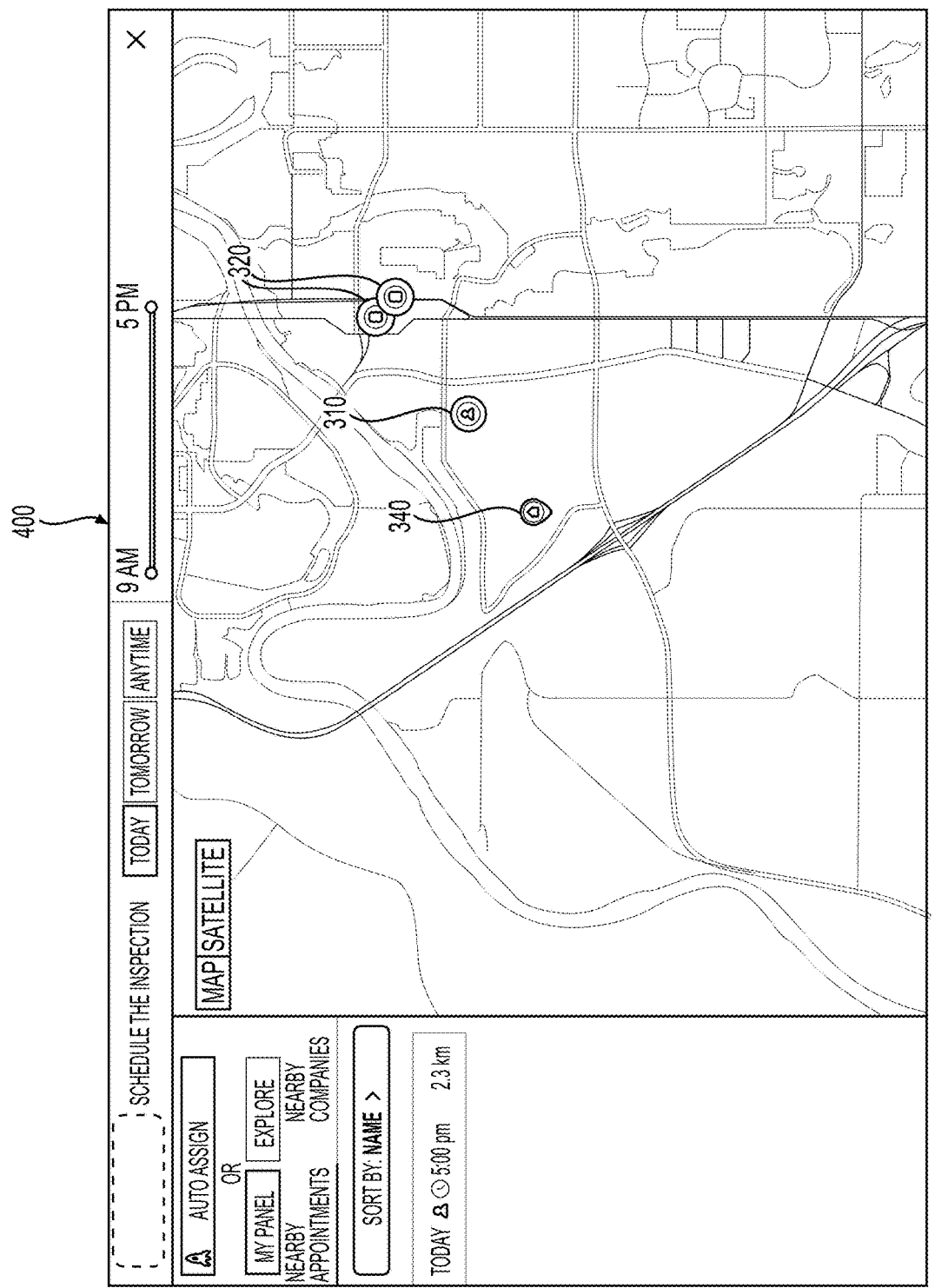
FIGS. 4A-4B illustrate additional graphical interfaces for a method for automatically finding an appraiser for a real estate appraisal order, according to one or more embodiments.
Figure 4B:
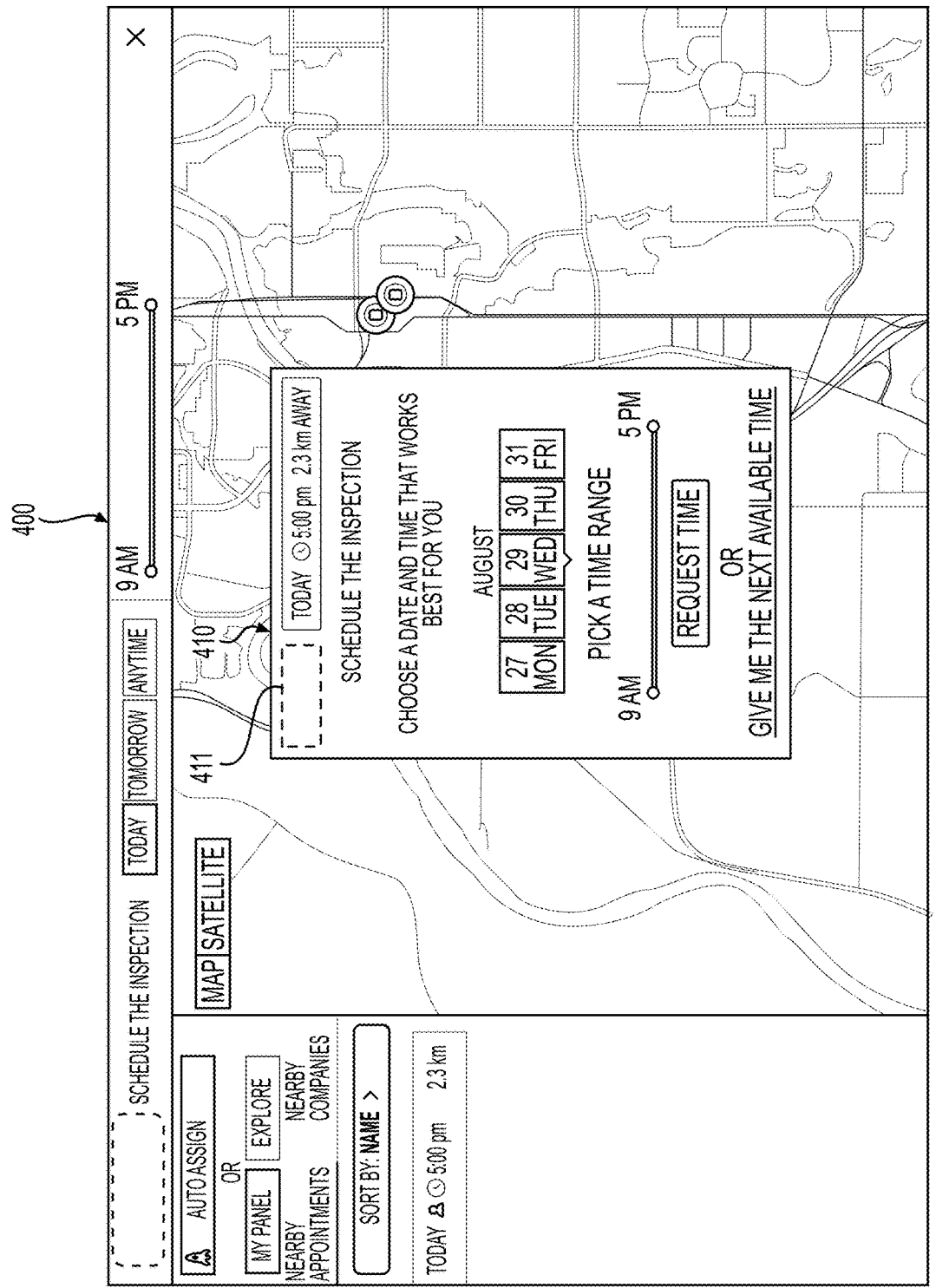

FIG. 4A depicts another example screen 400 of the user interface for using the appraisal management service. The lender has input a property location indicated by marker 340, and this location is near the offices of two appraisal companies, as indicated by icons 320. When the lender invokes the auto-assign feature, the computer system 110 selects an appraisal company, and the lender is presented with a scheduling interface 410 shown in FIG. 4B, allowing the lender to request a time (or time range) and date for the appraisal inspection. The scheduling interface 410 may display the name of the selected appraisal company at, for example, a top-left portion 411 of the interface.

When the user confirms a time using the scheduling interface 410, the computer system 110 may transmit, to the appraiser device corresponding to the selected appraiser ID or to a device of the appraisal company, a notification indicating a new order for appraisal inspection of the property (operation 203). The appraiser device may transmit, to the computer system 110, a reply indicating acceptance or rejection of the new order. If the new order is accepted, the appraisal inspection is scheduled, and the appraiser drives to the property to complete the inspection. Afterwards the appraiser may use a report writer to finish the designated report.

Figure 5:
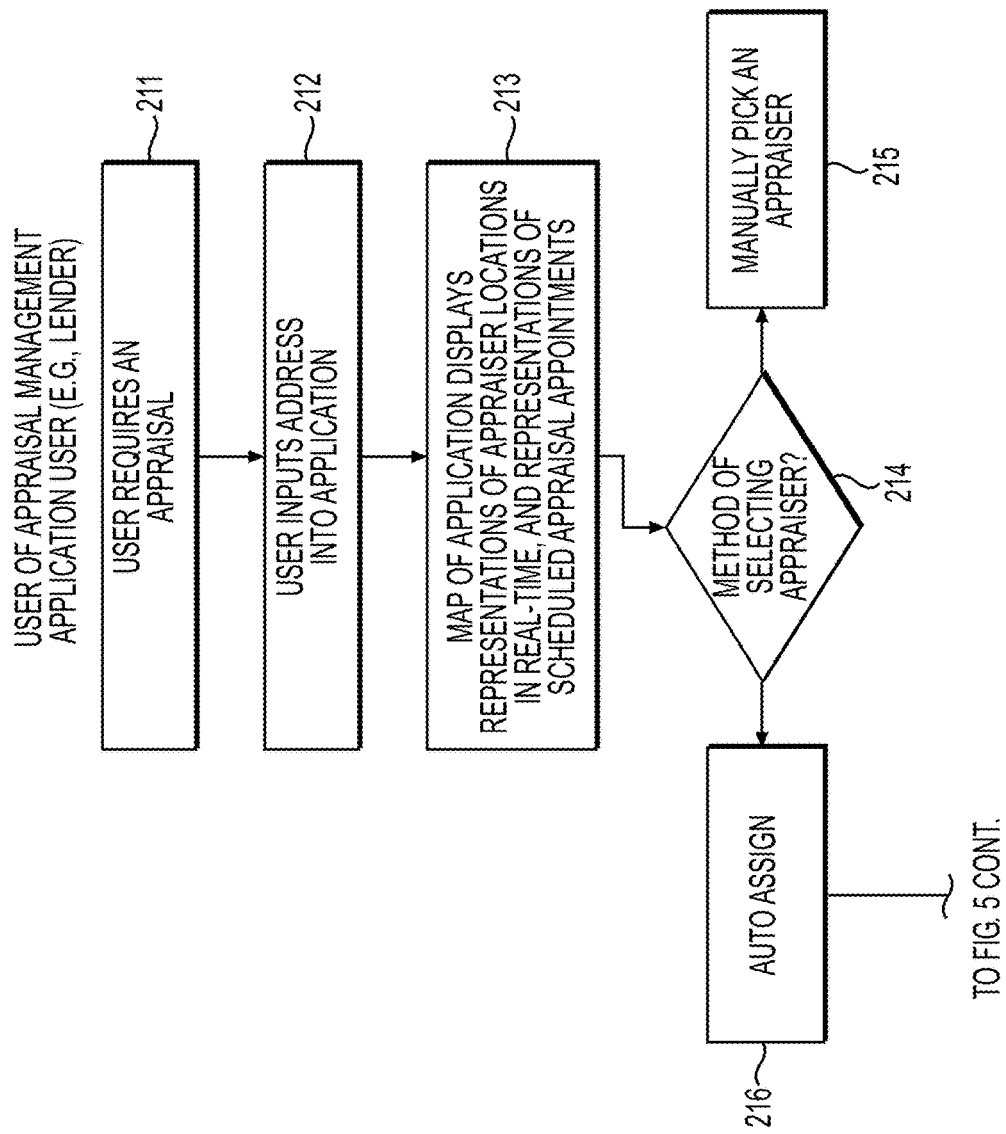
FIG. 5 is a flowchart depicting an example of a process that utilizes two methods for automatic selection of an appraiser, according to one or more embodiments.
Figure 5:
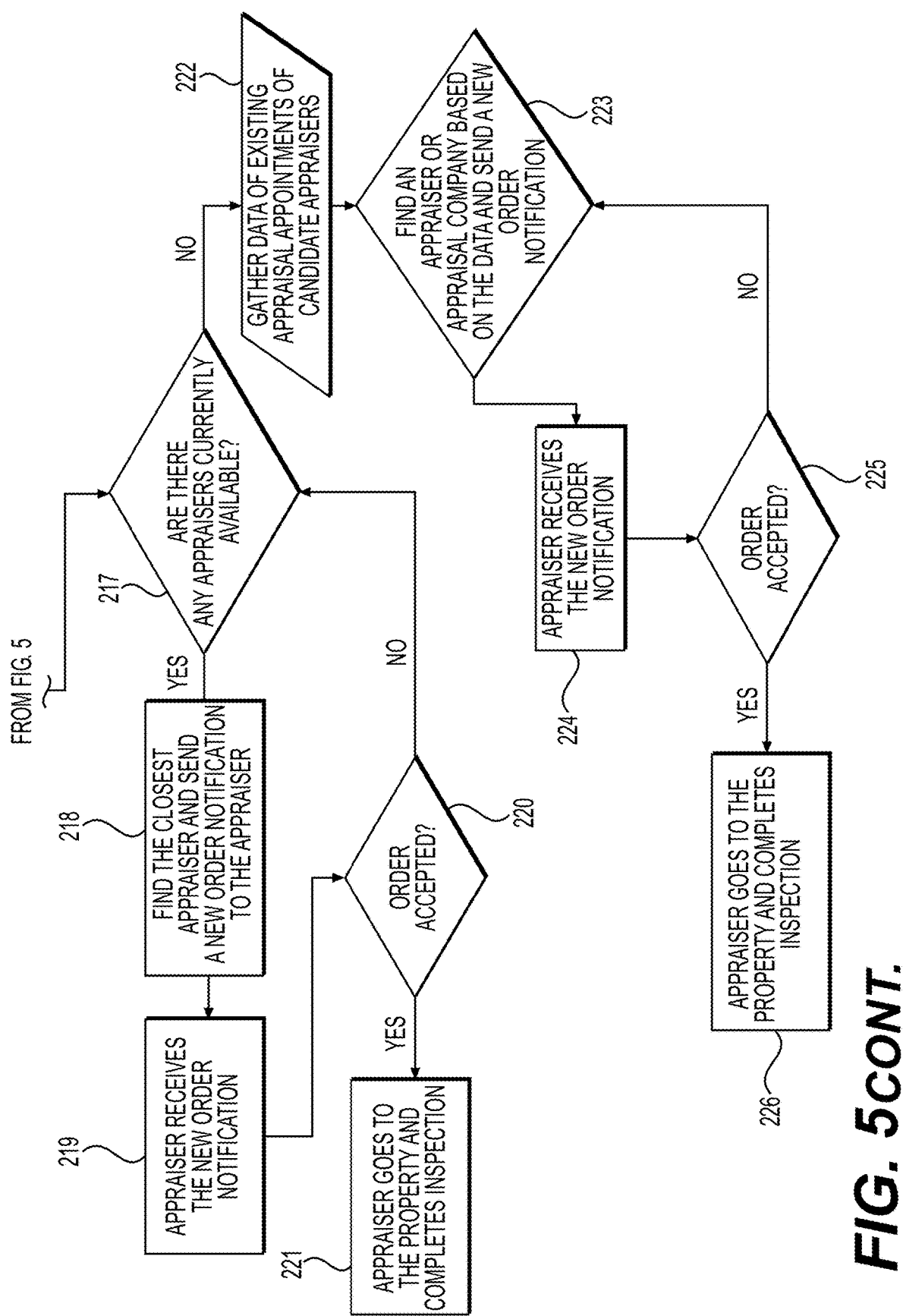

The two methods for automatic appraiser selection may be implemented as two modes of a larger process. FIG. 5 is a flowchart depicting an example of a process that utilizes the two method discussed above.

The process begins with the user of the appraisal management service requiring an appraisal (block 211). The user (user device 120) inputs the address of the property to be appraised into an application for using the appraisal management service (operation 212). In operation 212, the "application" is an application that is run by the user device 120 and may be, for example, a web browser that displays a web page received from the computer system 110.

Then, the map (e.g., map 305 of FIG. 3A) of the application displays graphical representations of appraisal locations in real-time (e.g., car icon 340 of FIG. 3A) and graphical representations of scheduled appraisal appointments (e.g., icon 310 of FIGS. 3A 4A). The scheduled appraisal appointments displayed on the map may include locations of appraisal appointments shared by an appraiser within the lender's network.

Then, the user may decide on a method of selecting an appraiser (block 214), which may be manual appraiser selection (block 215) or automatic section through the auto-assign feature of the appraisal management service.

Then, in operation 217, the computer system 110 determines whether there are any appraisers currently available. If there are appraisers that are currently available, the computer system 110 finds the closest appraisers and sends a new order notification to the appraiser (appraiser device) (operation 218). Operation 218 may comprise: finding the closest appraiser; displaying a scheduling interface (e.g., scheduling interface 310 of FIG. 3C) on the user device 120; receiving a selection from the user device 120 of a particular time (which may be a time range) for the appraisal inspection; and in response to receiving the selection from the user device, sending a new order notification to the appraiser. The new order notification may contain indicate the location and time of the requested appraisal.

The appraiser (appraiser device) receives the net order notification (operation 219), and, in response, transmits a message to the computer system 110 indicating whether or not the new order has been accepted (block 220). If the appraiser accepts the new order, then the appraiser goes to the property and completes the inspection (block 221). Additionally, when the computer system 110 receives the message indicating that the new order has been accepted, the computer system 110 may update the database 111 to associate the appraisal order with the appraiser ID of the appraiser.

If there are no appraisers currently available, the computer system 110 gathers data of existing appraisal appointments of candidate appraisers (operation 222), and finds an appraiser or appraisal company based on the data and sends a new order notification to the appraiser or appraisal company (operation 223). The candidate appraisers may be appraisers approved by the user to be part of the user's network. Then, the appraiser or appraisal company found in operation 223 receives the new order notification (block 224) and transmits a reply to the computer system indicating whether the order has been accepted (block 225). If the order is accepted, the appraiser or an appraiser of the appraisal company goes to the property and completes the inspection (block 226).

Figure 6:
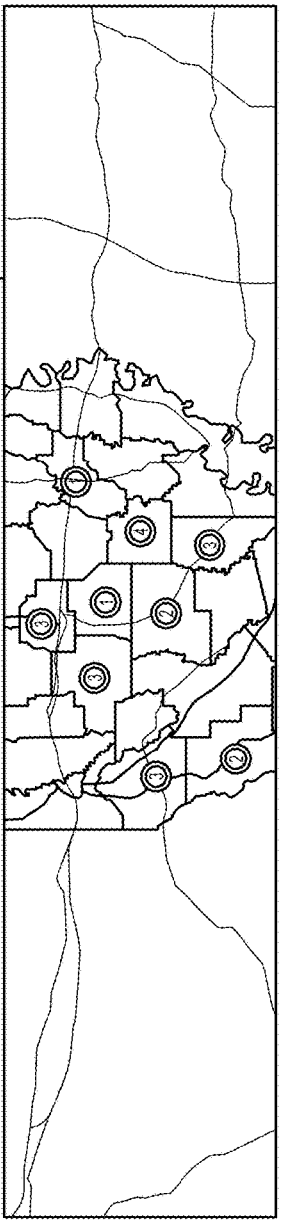
FIG. 6 is an example of a graphical interface for displaying a list of appraisal companies that are within the network of a lender, according to one or more embodiments.
Figure 7:
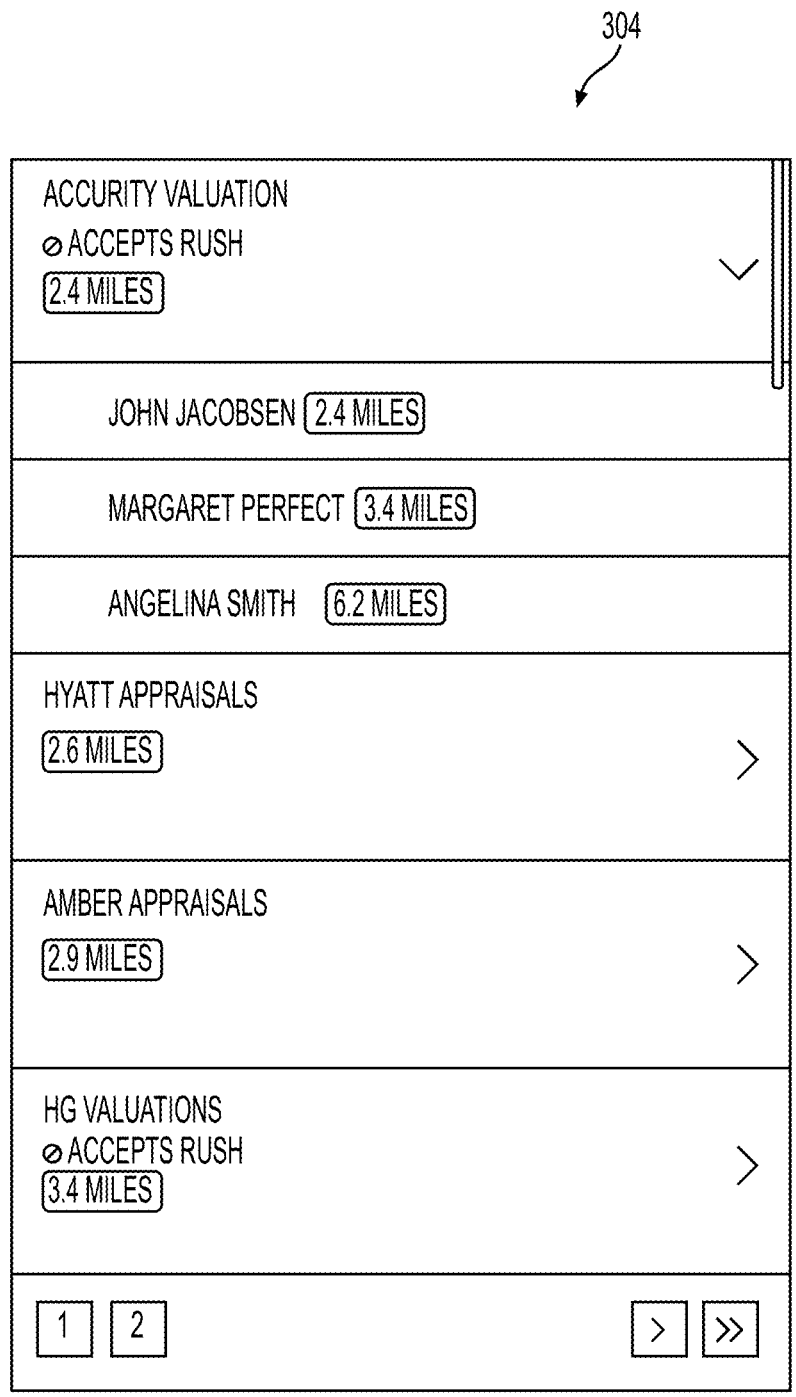
FIG. 7 is an example of a display of list of appraisal companies that are within the network of the lender, according to one or more embodiments.
Figure 8:
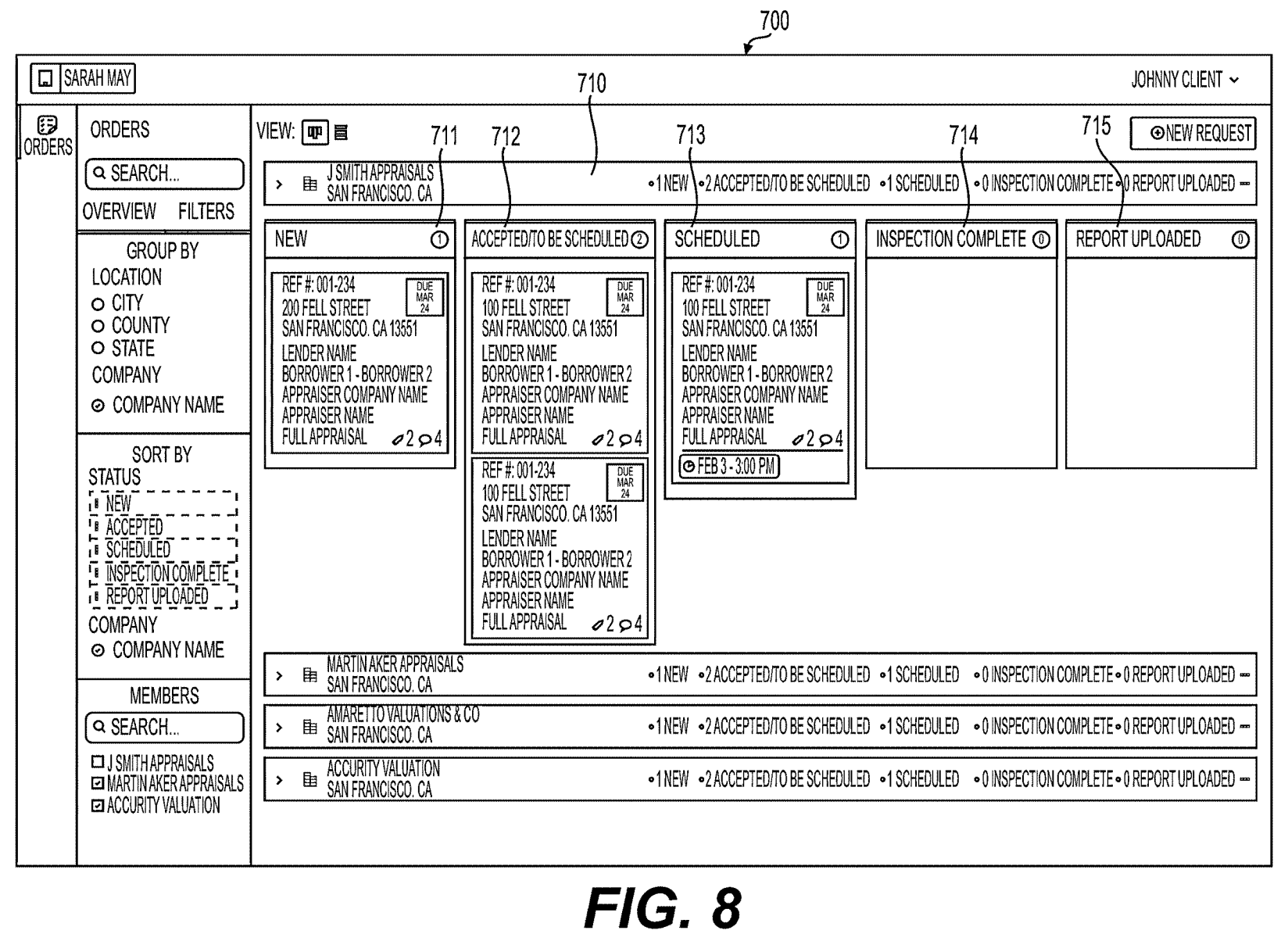

FIGS. 6-8 illustrate additional aspects of appraisal management service functionalities provided by the computer system 110.

FIG. 6 shows an interface displaying a list of appraisal companies that are within the network of a lender. The list may display the company name as well as associated characteristics, including the number of appraisers belonging to the company, services offered by the company, whether the company is a subscriber to the appraisal management service, and a lateness percentage in performing appraisals. Any of these characteristics may be used for the assignment algorithm discussed above.

FIG. 7 is another example of a list 304 of appraisal companies that are within the network of the lender. This list may be displayed as part of the interface shown in FIG. 3A.

FIG. 8 shows an interface displaying a list of appraisal orders of a lender. The list of appraisal orders may be grouped by the appraisal company (grouped below appraisal company heading 710), and may include new orders 711, accepted/to be scheduled orders 712, scheduled orders 713, orders in which the inspection has been completed 714 and orders in which the appraisal report has bene uploaded 715. For example, when an appraiser accepts a new order in accordance with blocks 220 and 225 of FIG. 5, the order may appear among the scheduled orders 713.

Figure 9:
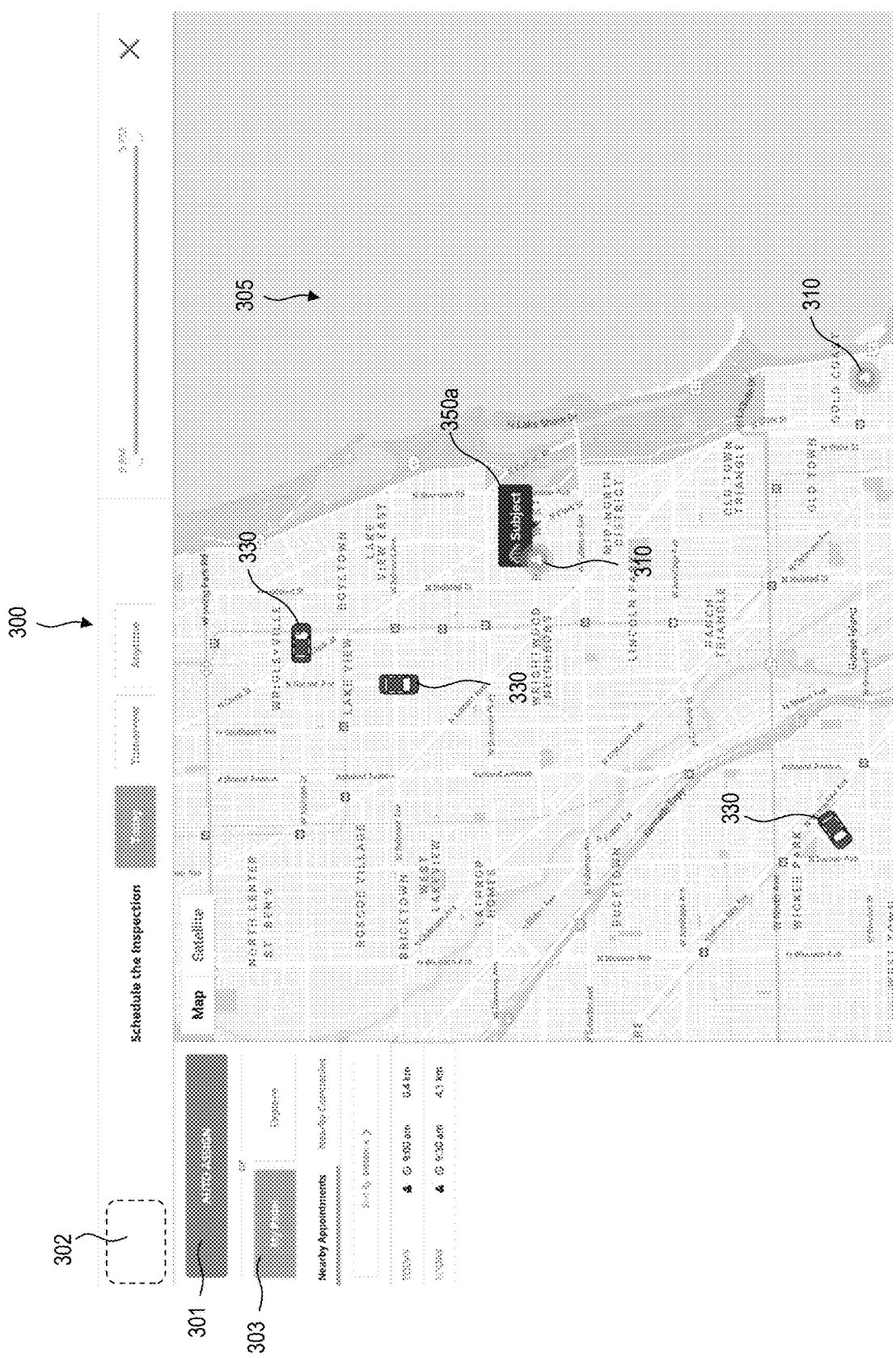
FIG. 9 illustrates another example of a graphical user interface for using the appraisal management service.

FIG. 9 illustrates another example of the user interface 300 for using the appraisal management service. As in FIG. 3A, the user interface 300 shown in FIG. 9 includes a map 305 labeled with graphical indicators 310 (circles with a user icon inside) indicating the location of appraisal appointments, and graphical indicators 360 (car icons) indicating appraiser locations. Additionally, the property to be appraised is marked by a marker 350*a*. The car icons 360 appear when the user of the appraiser device has indicated (using a mobile application, for example) that he or she is currently available ("available now"). When the indication has been made, the appraiser ID of the appraisal device can be matched to a user seeking to schedule appraisal appointments. The car icons 360 may move in real-time based on real-time GPS locations received from the appraiser devices.

As in FIG. 3A, the user interface 300 shown in FIG. 9 also includes an automatic appraiser assignment button 301 used to input a request for the appraisal management service to automatically assign an appraiser for appraisal inspection, and a "my panel" button 303. In FIG. 9A, the "Nearby Appointments" tab lists show the two appointments indicated by the graphical indicators 310 and may also list their distance (which may be a difference between two geographical locations or a distance along roads) to the location of marker 350a.

According to the methods and systems discussed above, appraisal inspections can be scheduled with efficiently, thereby reducing the overall loan origination time. Specifically, the methodologies discussed in this disclosure, facilitate quick feedback on the booking of the appraisal inspection, and further facilitate the bookings in a geographically efficient manner.

The appraisal inspection time, in any of the examples discussed above, may be same-day, next-day or in the future, but a lender using the appraisal management service may often prefer the inspection time to be on the same day. By the methodologies of this disclosure, the lender (and by extension, the borrower) is able to receive prompt confirmation of the inspection time. As a result, same-day appraisal inspection appointments become easier to schedule.

The methodologies discussed in the present disclosure are also able to facilitate the scheduling of nearby appointments for appraisers. Location is important to the appraisal industry. Because inspection times may vary depending on circumstances not necessarily predicable ahead of time, it is beneficial for an appraiser to minimize travel time. Standard distance routing can easily be disrupted. Thus, appraisers are much more likely to accept jobs nearby an appointment that is already scheduled appointment that is same or next day. Additionally, since appraisers incur expenses to drive to already scheduled appointment, getting a second (or third etc.) appraisal job close by reduces time and expenses. Additionally, being able to appraise a nearby property may result in increased efficiency in completing the appraisal report, since nearby properties may be of a similar type of property, may entail similar research, and may have similar comparable sales, all of which may lead to reduced report writing time.

A typical appraiser may complete between 20-50 appraisal orders per month in their service area. They may have a diverse book of business working with several lenders, AMCS, private clients (value estimates, taxes, foreclosure, divorce, estate) and mortgage brokers. As a result, it may be difficult to provide insight on where all of their jobs are in the entire book of business. When appraiser and lenders use user use the appraisal management service provided by the computer system 110 discussed above, the computer system 110 maintains information of the locations of all appraisal orders scheduled through the computer system. By using the methodologies discussed in this disclosure, an appraiser can share such information with a lender, which is then able to benefit from the information for purposes of appraisal inspection scheduling, even when that appraiser does not typically work with the lender.

Reducing the overall loan origination time benefits the bank by increasing customer satisfaction. Borrowers generally desire the loan origination process to proceed as quickly as possible, since they would benefit from obtaining the loan sooner rather than later. Furthermore, the obligation of coordinating the appraisal generally rests upon the bank. Thus, the longer the borrower has to wait for the appraisal, the worse it looks on the lender even though a large part of it is out of their control.

Any data or information that is shown in a graphical user interface of this disclosure may be stored in the computer system 110, and any data or information that a user may input using a graphical user interface of this disclosure may be received by the computer system 110 and stored in the computer system 110. The computer system 110 may be configured to generate the graphical user interfaces in a format displayable on a web browser.

The methods described herein may be performed by one or more processors that accept computer-readable (also called machine-readable) code containing a set of instructions that when executed by one or more of the processors carry out at least one of the methods described herein. The one or more processors may include any processor capable of executing a set of instructions (sequential or otherwise) that specify actions to be taken are included.

In one or more embodiments, the one or more processors may be included in a processing system. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The memory as used herein, if clear from the context and unless explicitly stated otherwise, also encompasses a storage system such as a disk drive. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable storage medium may form, or be included in a computer program product.

The processing system discussed in the preceding paragraph may be computer system 110 shown in FIG. 1. Additionally, user device 120 and appraiser devices 130 may also have hardware components similar to those discussed above.

In other embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium may be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire, and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. Functionality may be added or deleted from the block diagrams and operations may be interchanged among functional blocks. Steps may be added or deleted to methods described within the scope of the present invention.

What is claimed is:

1. A computer-implemented method for collaboratively scheduling an appraisal inspection via an interactive interface that is distributed over a plurality of remote devices, the method being performed by a computer system, the method comprising:
   receiving, from a first instance of the interactive interface operating on a user device connected to the computer system, and via an interaction with a user associated with the user device:
   a location of a real estate property to be appraised; and
   a request to automatically assign an appraiser for an inspection of the real estate property;
   accessing a database of the computer system, the database including records that, for each a plurality of appraisers, includes:

location information for the appraiser, the location information including one or more of a current location associated with the appraiser or locations and times of existing inspection appointments for the appraiser;
availability information for the appraiser;
an acceptance rate at which the appraiser accepts a new appraisal; and
an overdue percentage associated with the appraiser;
for each of the plurality of appraisers:
  determining, based on the location information and the availability information, proximity information associated with a proximity between the location of the real estate property to be appraised and one or more locations the appraiser is at or scheduled to be at during a period of time at which the appraiser has availability; and
  generating an assignment index value based on a weighted combination of the proximity information, the acceptance rate, and the overdue percentage;
selecting, based on a comparison of the assignment indexes of the plurality of appraisers, (i) an appraiser from the plurality of appraisers to inspect the real estate property, and (ii) a time for the inspection of the real estate property;
transmitting a notification to a second instance of the interactive interface operating on an appraiser device associated with the selected appraiser, the notification configured to cause the second instance of the interactive interface to output the time for the inspection, the location of the real estate property, and an interactive prompt for the selected appraiser to accept the inspection; and
in response to receiving, from the second instance of the interactive interface, an acceptance of the inspection by the selected appraiser, updating the database with data associating the inspection with the selected appraiser.

2. The computer-implemented method of claim 1, wherein the time for the inspection of the real estate property is selected based on the availability information of the selected appraiser.

3. The computer-implemented method of claim 1, wherein the current location associated with the appraiser is determined using GPS of the appraiser device.

4. The computer-implemented method of claim 1, further comprising:
  causing the first instance of the interactive interface to output a map that includes a first graphical indicator indicative of a location of the real estate property and a second graphical indicator indicative of a location of the selected appraiser.

5. The computer-implemented method of claim 4, wherein a position of the second graphical indicator is updated in real-time based on a GPS of the appraiser device.

6. The computer-implemented method of claim 1, further comprising:
  causing the first instance of the interactive interface to output a map that includes a plurality of graphical indicators indicative of the location information of the plurality of appraisers.

7. The computer-implemented method of claim 1, wherein the proximity information includes one or more of a geographical distance, a road distance, or a travel-time proximity.

8. A computer system for collaboratively scheduling an appraisal inspection via an interactive interface that is distributed over a plurality of remote devices, the system comprising:
  at least one memory storing instructions and a database, the database including records that, for each of a plurality of appraisers, includes:
    location information for the appraiser, the location information including one or more of a current location associated with the appraiser or locations and times of existing inspection appointments for the appraiser;
    availability information for the appraiser;
    an acceptance rate at which the appraiser accepts a new appraisal; and
    an overdue percentage associated with the appraiser; and
  at least one processor operatively connected to the at least one memory and configured to execute the instructions to perform operations, including:
    receiving, from a first instance of the interactive interface operating on a user device connected to the computer system, and via an interaction with a user associated with the user device:
      a location of a real estate property to be appraised; and
      a request to automatically assign an appraiser for an inspection of the real estate property;
    accessing the database and, for each of the plurality of appraisers:
      determining, based on the location information and the availability information, proximity information associated with a proximity between the location of the real estate property to be appraised and one or more locations the appraiser is at or scheduled to be at during a period of time at which the appraiser has availability; and
      generating an assignment index value based on a weighted combination of the proximity information, the acceptance rate, and the overdue percentage;
    selecting, based on a comparison of the assignment indexes of the plurality of appraisers, (i) an appraiser from the plurality of appraisers to inspect the real estate property, and (ii) a time for the inspection of the real estate property;
    transmitting a notification to a second instance of the interactive interface operating on an appraiser device associated with the selected appraiser, the notification configured to cause the second instance of the interactive interface to output the time for the inspection, the location of the real estate property, and an interactive prompt for the selected appraiser to accept the inspection; and
    in response to receiving, from the second instance of the interactive interface, an acceptance of the inspection by the selected appraiser, updating the database with data associating the inspection with the selected appraiser.

9. The computer system of claim 8, wherein the time for the inspection of the real estate property is selected based on the availability information of the selected appraiser.

10. The computer system of claim 8, wherein the current location associated with the appraiser is determined using GPS of the appraiser device.

11. The computer system of claim 8, wherein the operations further include:

causing the first instance of the interactive interface to output a map that includes a first graphical indicator indicative of a location of the real estate property and a second graphical indicator indicative of a location of the selected appraiser.

12. The computer system of claim 11, wherein a position of the second graphical indicator is updated in real-time based on a GPS of the appraiser device.

13. The computer system of claim 8, further comprising:
causing the first instance of the interactive interface to output a map that includes a plurality of graphical indicators indicative of the location information of the plurality of appraisers.

14. The computer system of claim 8, wherein the proximity information includes one or more of a geographical distance, a road distance, or a travel-time proximity.

15. A non-transitory computer-readable medium comprising instructions for collaboratively scheduling an appraisal inspection via an interactive interface that is distributed over a plurality of remote devices, the instructions executable by at least one processor of a computer system to perform operations, including:
receiving, from a first instance of the interactive interface operating on a user device connected to the computer system, and via an interaction with a user associated with the user device:
a location of a real estate property to be appraised; and
a request to automatically assign an appraiser for an inspection of the real estate property;
accessing a database of the computer system, the database including records that, for each a plurality of appraisers, includes:
location information for the appraiser, the location information including one or more of a current location associated with the appraiser or locations and times of existing inspection appointments for the appraiser;
availability information for the appraiser;
an acceptance rate at which the appraiser accepts a new appraisal; and
an overdue percentage associated with the appraiser;
for each of the plurality of appraisers:
determining, based on the location information and the availability information, proximity information associated with a proximity between the location of the real estate property to be appraised and one or more locations the appraiser is at or scheduled to be at during a period of time at which the appraiser has availability; and
generating an assignment index value based on a weighted combination of the proximity information, the acceptance rate, and the overdue percentage;
selecting, based on a comparison of the assignment indexes of the plurality of appraisers, (i) an appraiser from the plurality of appraisers to inspect the real estate property, and (ii) a time for the inspection of the real estate property;
transmitting a notification to a second instance of the interactive interface operating on an appraiser device associated with the selected appraiser, the notification configured to cause the second instance of the interactive interface to output the time for the inspection, the location of the real estate property, and an interactive prompt for the selected appraiser to accept the inspection; and
in response to receiving, from the second instance of the interactive interface, an acceptance of the inspection by the selected appraiser, updating the database with data associating the inspection with the selected appraiser.

16. The non-transitory computer-readable medium of claim 15, wherein the time for the inspection of the real estate property is selected based on the availability information of the selected appraiser.

17. The non-transitory computer-readable medium of claim 15, wherein the current location associated with the appraiser is determined using GPS of the appraiser device.

18. The non-transitory computer-readable medium of claim 15, further comprising:
causing the first instance of the interactive interface to output a map that includes a first graphical indicator indicative of a location of the real estate property and a second graphical indicator indicative of a location of the selected appraiser, wherein a position of the second graphical indicator is updated in real-time based on a GPS of the appraiser device.

19. The non-transitory computer-readable medium of claim 15, wherein the operations further include:
causing the first instance of the interactive interface to output a map that includes a plurality of graphical indicators indicative of the location information of the plurality of appraisers.

20. The non-transitory computer-readable medium of claim 15, wherein the proximity information includes one or more of a geographical distance, a road distance, or a travel-time proximity.

* * * * *